(12) United States Patent
Sellman

(10) Patent No.: US 6,370,230 B1
(45) Date of Patent: Apr. 9, 2002

(54) METHOD AND SYSTEM FOR DIAGNOSING AND TESTING MODEMS AND INTERMACHINE TRUNKS

(75) Inventor: Collin A. Sellman, Denver, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/472,581

(22) Filed: Dec. 27, 1999

(51) Int. Cl.[7] .......................... H04M 1/24; H04M 3/08; H04M 3/22
(52) U.S. Cl. ................ 379/22.04; 379/1.04; 379/15.03; 379/27.01; 370/241; 370/242; 370/251
(58) Field of Search ................................. 370/241, 244, 370/245, 247, 248, 249, 250, 251–253; 379/1.03, 1.04, 15.03, 14.01, 12, 15.05, 16, 22, 22.01–22.02, 22.03, 22.04, 27.01

(56) References Cited

U.S. PATENT DOCUMENTS

| | | |
|---|---|---|
| 4,918,623 A | 4/1990 | Lockitt et al. |
| 5,265,151 A | 11/1993 | Goldstein |
| 6,002,671 A * | 12/1999 | Kahkoska et al. |
| 6,052,565 A * | 4/2000 | Ishikura et al. |
| 6,058,162 A * | 5/2000 | Nelson et al. |
| 6,061,427 A * | 5/2000 | Ryoo |
| 6,091,713 A * | 7/2000 | Lechleider et al. |
| 6,219,378 B1 * | 4/2001 | Wu |

* cited by examiner

*Primary Examiner*—Duc Nguyen
(74) *Attorney, Agent, or Firm*—Brooks & Kushman, P.C.

(57) ABSTRACT

A method and system for testing trunks and modems of communication lines includes identifying a trunk and a modem in a communication line from trunk signaling (SS7) data. Historic performance data of the modem in the communication line is then measured. The historic performance data includes the time the modem is connected with the trunk, the speed at which data is communicated through the modem and the trunk in the communication line, and the rate at which the modem connects with the trunk. The performance data of the modem is then correlated with the trunk signaling data to associate the performance data of the modem with the trunk in the communication line. The performance data of the modem is then analyzed to determine if the communication line is operating improperly. The analysis is performed to determine whether the trunk or the modem is operating improperly.

22 Claims, 2 Drawing Sheets

METHOD AND SYSTEM FOR DIAGNOSING AND TESTING MODEMS AND INTERMACHINE TRUNKS

TECHNICAL FIELD

The present invention relates generally to methods and systems for testing modems and trunks and, more particularly, to a method and system for testing a communication line having a modem associated with a respective trunk by using historical modem data in conjunction with trunk signaling data.

BACKGROUND ART

Remote office test line (ROTL) tests the ability of a DS0 or a trunk to pass a series of tones. A DS0 and a trunk are communication lines between two switches carrying one voice signal. ROTL testing measures trunk parameters such as gain slope, echo return loss, noise, attenuation, and the like. A network operations center performs ROTL testing periodically such as once a week. A problem with ROTL testing is that there is no correlation of actual modem performance to specific DS0s. In essence, the problem with ROTL testing is that it does not test the ultimate quality indicator such as the actual level of service the user is experiencing. What is needed is a method and system for testing the actual level of service provided by modems and associated trunks.

SUMMARY OF THE INVENTION

Accordingly, it is an object of the present invention to provide a method and system for testing a communication line having a modem and an associated trunk by using historical modem data in conjunction with signaling data.

It is another object of the present invention to provide a method and system for testing a modem associated with a trunk by using historical modem data in conjunction with trunk signaling data.

It is a further object of the present invention to provide a method and system for testing a trunk associated with a modem by using historical modem data in conjunction with trunk signaling data.

It is still another object of the present invention to provide a method and system for testing a modem associated with a trunk by using historical modem data such as connect rates, connect times, and connect speeds in conjunction with signaling system 7 (SS7) signaling data.

It is still a further object of the present invention to provide a method and system for testing a trunk associated with a modem by using historical modem data such as connect rates, connect times, and connect speeds in conjunction with SS7 signaling data.

In carrying out the above objects and other objects, the present invention provides a method for testing trunks and modems of communication lines. The method includes identifying a trunk and a modem in a communication line from trunk signaling data. Performance data of the modem in the communication line is then measured. The performance data of the modem is correlated with the trunk signaling data to associate the performance data of the modem with the trunk in the communication line. The performance data of the modem is then analyzed to determine if the communication line is operating improperly.

The performance data of the modem may be analyzed to determine if the trunk is operating improperly. The performance data of the modem may also be analyzed to determine if the modem is operating improperly. The performance data of the modem includes the time the modem is connected with the trunk, the speed of which data is communicated through the modem and the trunk in the communication line, and the rate at which the modem connects with the trunk.

Further, in carrying out the above objects and other objects, the present invention provides a method and an associated system for testing trunks in communications lines. The method is for use in a communications network having a communications system and a signaling network. The communications system includes trunks and modems. The signaling network is operable with the communications system to establish communication lines using trunk signaling data. Each communication line includes a trunk and a modem. The method includes measuring performance data of a first modem in a first communication line. The first communication line includes the first modem and a trunk. The performance data of the first modem is then correlated with the trunk signaling data to associate the performance data of the first modem with the trunk. The performance data of a second modem in a second communication line is then measured. The second communication line includes the second modem and the trunk. The performance data of the second modem is then correlated with the trunk signaling data to associate the performance data of the second modem with the trunk. The performance data of the first modem and the second modem are then analyzed to determine if the trunk is operating improperly.

Still, in carrying out the above objects and other objects, the present invention provides a method and an associated method for testing modems in communication lines for use in the communications network. The method includes measuring performance data of a modem in a first communication line. The first communication line includes the modem and a first trunk. The performance data of the modem is then correlated with the trunk signaling data to associate the performance data of the modem with the first communication line. The performance data of the modem in a second communication line is then measured. The second communication line includes the modem and a second trunk. The performance data of the modem is then correlated with the second trunk signaling data to associate the performance data of the modem with the second communication line. The performance data of the modem of the first communication line and the performance data of the modem of the second communication line are then analyzed to determine if the modem is operating properly.

The above objects and other objects, features, and advantages of the present invention will be apparent from the following detailed description of the best mode for carrying out the invention when taken in connection with the accompanying drawings.

BEST MODE FOR CARRYING OUT THE INVENTION

Figure 1:
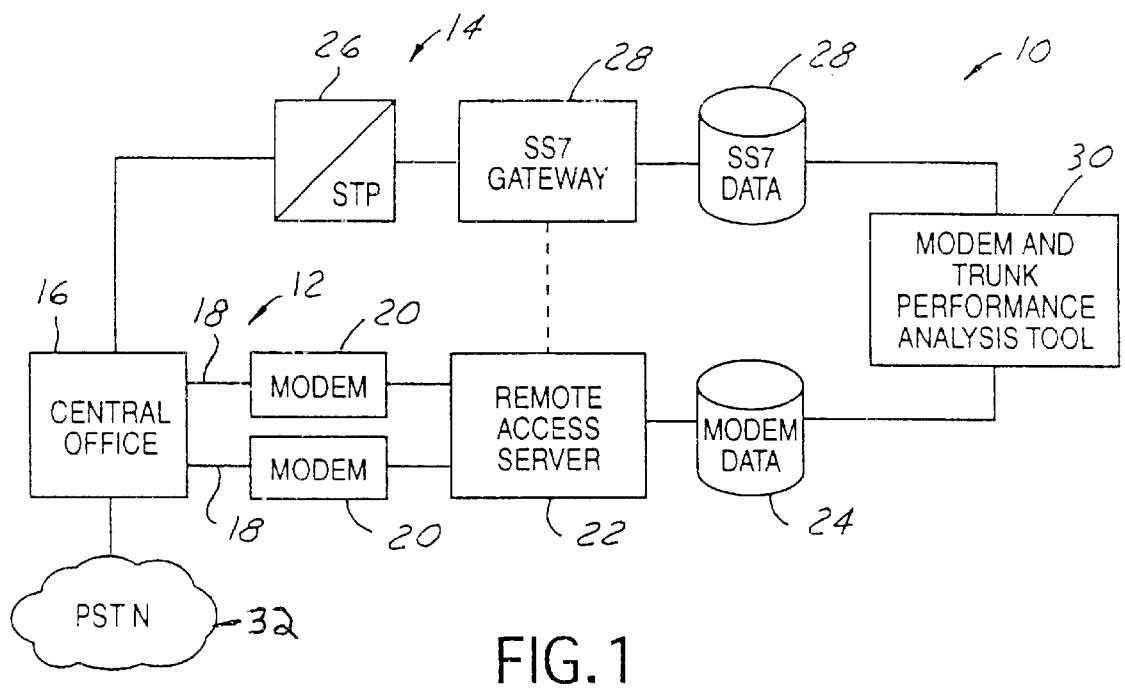
FIG. 1 illustrates a system for carrying out the method of the present invention for testing a modem associated with a respective trunk by using historical modem data in conjunction with signaling data.

Referring now to FIG. 1, a system 10 for carrying out the method of the present invention is shown. System 10 generally tests a modem associated with a respective trunk by using historical modem data in conjunction with trunk signaling data. System 10 also generally tests a trunk associated with at least one modem by using historical modem data in conjunction with trunk signaling data.

System 10 includes a communications system 12 and a signaling network 14. Communications system 12 includes a central office 16 and a plurality of intermachine trunks or DS0s 18. Central office 16 includes a telephone switch for switching trunks 18 to the public switched telephone network (PSTN) 32. Each trunk 18 is associated with a respective modem 20 for establishing a communication line for communicating digital signals. Trunks 18 associate with different modems or the same modem each time a communication line is established. Modems convert digital signals to analog signals and vice versa. Users access modems 20 to communicate digital signals over trunks 18 with the PSTN 32 via central office 16. A remote access server 22 connects modems 20 to a modem database 24. Remote access server 22 provides modem database 24 with access to modems 20 for receiving data regarding the modems.

Signaling network 14 is preferably a signaling system 7 (SS7) network. SS7 network 14 provides out of band signaling for setting up and tearing down calls. SS7 network 14 provides supervising, alerting, and addressing telecommunication functions. The supervising function includes monitoring the status of a trunk to see if it is busy, idle, or requesting service. The alerting function provides an indication of the arrival of an incoming call. The addressing function provides routing and destination signals. SS7 network 14 includes a signaling transfer point (STP) 26 connected to central office 16. A SS7 gateway 28 connects STP 26 to a SS7 database 28. SS7 database 28 receives signaling data regarding trunks 18. SS7 gateway 28 is operable to provide the signaling data to remote access server 22. The signaling data is indicative of which trunks are being used for establishing communication lines and which modems are associated with the trunks in the communication lines.

A modem and trunk performance analysis tool 30 connects with modem database 24 and SS7 database 28. Modem database 24 receives historical modem data from each of modems 20. The historical modem data includes modem connect rates, modem connect times, modem connect speeds, and other connection quality related statistics of each modem. The modem connect rate is the rate at which a modem connects with a trunk. A low connect rate indicates that the modem is having trouble connecting with a trunk. The modem connect time indicates how long a user is using the modem. A short connect time on a particular trunk indicates that users are connecting with the trunk, having problems, and then hanging up to disconnect the connection with the trunk. The modem connect speed indicates the connection quality of the trunk. Consistent low connect speeds on a particular trunk indicates a problem with the trunk.

SS7 database 28 receives signaling information for each of trunks 18. Performance tool 30 uses the trunk signaling data to correlate the historical modem data of each modem 20 with a particular trunk 18. Performance tool 30 correlates the historical modem data with specific trunks 18 to provide a trunk by trunk analysis to determine if specific trunks are experiencing less than optimal performance. Performance tool 30 also correlates the historical modem data with the signaling data to measure the performance of modems 20 over specific trunks 18.

Performance tool 30 determines if an individual trunk is experiencing degradation or total failure by identifying the deviation of that trunk from all of the other trunks. Performance tool 30 may trend individual trunk performance over a given period of time and examine individual trunk performance at any point in time and over any period of time. The historical modem data in conjunction with the signaling data may be used by performance tool 30 to diagnose end user modem connection problems by comparing an individual end user's results with the average results of all of the users on the same trunk group.

In operation, modem database 24 collects modem data for each of modems 20. SS7 database 28 collects trunk signaling data or call data for each of trunks 18. Performance tool 30 determines for each communication line which modem is connected with a trunk from the trunk signaling data. Performance tool 30 then analyzes the modem data to determine which modems and/or trunks are experiencing problems. Performance tool 30 analyzes the modem data in conjunction with the signaling data to provide for trunk level trending, modem trending, and end user troubleshooting. Thresholds can be set in performance tool 30 to trigger alerts if significant deviations in an individual trunk or group of trunks are detected. Similarly, thresholds can be set in performance tool 30 to trigger alerts if significant deviations in a modem is detected. The analysis provided by performance tool 30 may be made periodically on a daily basis to enable the network operations center to react quicker.

Figure 2:
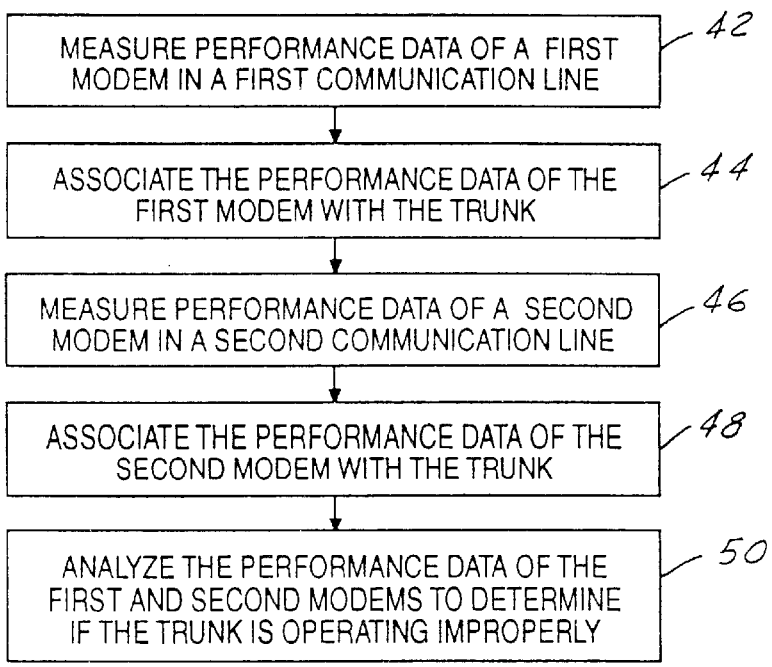
FIG. 2 illustrates a flow chart describing operation of the method and system of the present invention.

Referring now to FIG. 2, a flow chart 40 illustrating operation of the method and system for testing the trunks of communication lines in accordance with the present invention is shown. The operation of the method and system of the present invention is for use in a communications network having a communications system and a signaling network. The communications system includes a plurality of trunks and a plurality of modems. The signaling network is operable with the communications system to establish communication lines using trunk signaling data. Each communication line includes a trunk and a modem. Box 42 begins with measuring performance data of a first modem in a first communication line. The first communication line includes the first modem and a trunk. Box 44 then correlates the performance data of the first modem with the trunk signaling data to associate the performance data of the first modem with the trunk. Box 46 then measures performance data of a second modem in a second communication line. The second communication line includes the second modem and the trunk. Box 48 then correlates the performance data of the second modem with the trunk signaling data to associate the performance data of the second modem with the trunk. Box 50 then analyzes the performance data of the first and second modems to determine if the trunk is operating improperly.

Figure 3:
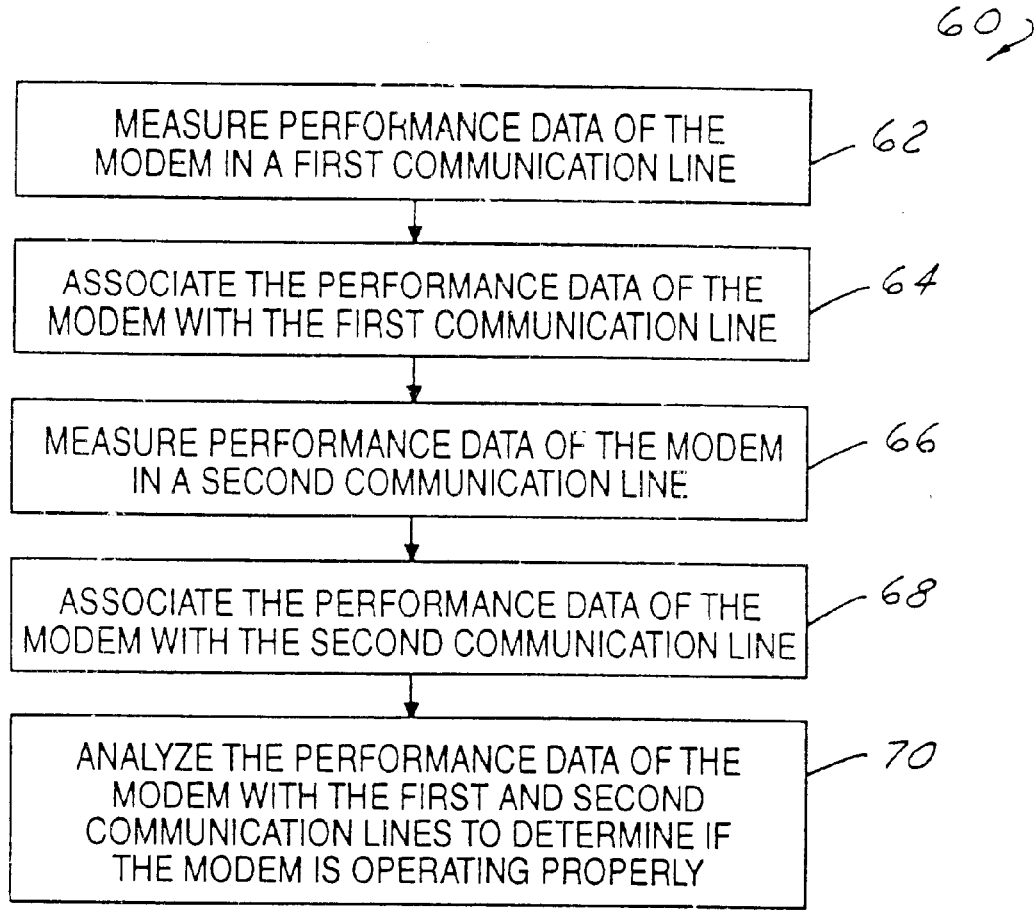
FIG. 3 illustrates a flow chart describing operation of the method and system of the present invention.

Referring now to FIG. 3, a flow chart 60 illustrating operation of the method and system for testing the modem of a communication line for use with the communications network. Box 62 begins with measuring performance data of the modem in a first communication line. The first communication line includes the modem and a first trunk. Box 64 then correlates the performance data of the modem with the trunk signaling data to associate the performance data of the modem with the first communication line. Box 66 then measures performance data of the modem in a second communication line. The second communication line includes the modem and a second trunk. Box 68 then correlates the performance data of the modem with the second trunk signaling data to associate the performance data of the modem with the second communication line. Box 70 then analyzes the performance data of the modem of the first communication line and the performance data of the modem of the second communication line to determine if the modem is operating properly.

Thus, it is apparent that there has been provided, in accordance with the present invention, a method and system for testing a communication line having a modem associated with a respective trunk by using historical modem data in conjunction with trunk signaling data that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for testing trunks and modems of communication lines, the method comprising:

identifying a trunk and a modem in a communication line from trunk signaling data;

measuring performance data of the modem in the communication line;

correlating the performance data of the modem with the trunk signaling data to associate the performance data of the modem with the trunk in the communication line; and analyzing the performance data of the modem to determine if the communication line is operating improperly.

2. The method of claim 1 wherein:

analyzing the performance data of the modem includes analyzing the performance data of the modem to determine if the trunk is operating improperly.

3. The method of claim 1 wherein:

analyzing the performance data of the modem includes analyzing the performance data of the modem to determine if the modem is operating improperly.

4. The method of claim 1 wherein:

the performance data of the modem includes the time the modem is connected with the trunk.

5. The method of claim 1 wherein:

the performance data of the modem includes the speed of which data is communicated through the modem and the trunk in the communication line.

6. The method of claim 1 wherein:

the performance data of the modem includes the rate at which the modem connects with the trunk.

7. In a communications network having a communications system and a signal network, the communications system including a plurality of trunks and a plurality of modems, the signaling network operable with the communications system to establish communication lines using trunk signaling data, wherein each communication line includes a trunk and a modem, a method for testing the trunks of the communication lines, the method comprising:

measuring performance data of a first modem in a first communication line, the first communication line including the first modem and a trunk;

correlating the performance data of the first modem with the trunk signaling data to associate the performance data of the first modem with the trunk;

measuring performance data of a second modem in a second communication line, the second communication line including the second modem and the trunk;

correlating the performance data of the second modem with the trunk signaling data to associate the performance data of the second modem with the trunk; and analyzing the performance data of the first modem and the second modem to determine if the trunk is operating improperly.

8. The method of claim 7 wherein:

the performance data of the first and second modems includes the time the first and second modems are connected with the trunk.

9. The method of claim 7 wherein:

the performance data of the first and second modems includes the speed of which data is communicated through the first and second modems.

10. The method of claim 7 wherein:

the performance data of the first and second modems includes the rate at which the first and second modems connect with the trunk.

11. In a communications network having a communications system and a signaling network, the communications system including a plurality of trunks and a plurality of modems, the signaling network operable with the communications system to establish communication lines using trunk signaling data, wherein each communication line includes a trunk and a modem, a method for testing the modems of the communication lines, the method comprising:

measuring performance data of a modem in a first communication line, the first communication line including the modem and a first trunk;

correlating the performance data of the modem with the trunk signaling data to associate the performance data of the modem with the first communication line;

measuring performance data of the modem in a second communication line, the second communication line including the modem and a second trunk;

correlating the performance data of the modem with the second trunk signaling data to associate the performance data of the modem with the second communication line; and analyzing the performance data of the modem of the first communication line and the performance data of the modem of the second communication line to determine if the modem is operating properly.

12. The method of claim 11 wherein:

the performance data of the modem in the first and second communication lines includes the time the modem is connected with the first and second trunks.

13. The method of claim 11 wherein:

the performance data of the modem in the first and second communication lines includes the rate at which the modem connects with the first and second trunks.

14. The method of claim 11 wherein:

the performance data of the modem in the first and second communication lines includes the speed of which data is communicated through the modem in the first and second communication lines.

15. In a communications network having a communications system and a signaling network, the communications system including a plurality of trunks and a plurality of modems, the signaling network operable with the communications system to establish communication lines using trunk signaling data, wherein each communication line includes a trunk and a modem, a system for testing the trunks of the communication lines, the system comprising:

a modem database for storing performance data of a first modem in a first communication line and for storing performance data of a second modem in a second communication line, the first communication line including the first modem and a trunk, the second communication line including the second modem and the trunk;

a signaling database for storing trunk signaling data for the first and second communication lines, the signaling data associating a modem with the trunk for each communication line; and a performance tool operable with the modem database and the signaling database for correlating the performance data of the first and second modems with the trunk signaling data to associate the performance data of the first and second modems with the trunk, the performance tool further operable for analyzing the performance data of the first and second modems to determine if the trunk is operating improperly.

16. The system of claim 15 wherein:

the performance data of the first and second modems includes the time the first and second modems are connected with the trunk.

17. The system of claim 15 wherein:

the performance data of the first and second modems includes the speed of which data is communicated through the first and second modems.

18. The system of claim 15 wherein:

the performance data of the first and second modems includes the rate at which the first and second modems connect with the trunk.

19. In a communications network having a communications system and a signaling network, the communications system including a plurality of trunks and a plurality of modems, the signaling network operable with the communications system to establish communication lines using trunk signaling data, wherein each communication line includes a trunk and a modem, a system for testing the modems of the communication lines, the system comprising:

a modem database for storing performance data of a modem in a first communication line and for storing performance data of the modem in a second communication line, the first communication line including the modem and a first trunk, the second communication line including the modem and a second trunk;

a signaling database for storing trunk signaling data for the first and second communication lines, the signaling data associating the modem with a trunk for each communication line; and a performance tool operable with the modem database and the signaling database for correlating the performance data of the modem with the trunk signaling data to associate the performance data of the modem with the first and second trunks, the performance tool further operable for analyzing the performance data of the modem with the first trunk and the performance data of the modem with the second trunk to determine if the modem is operating improperly.

20. The system of claim 19 wherein:

the performance data of the modem in the first and second communication lines includes the time the modem is connected with the first and second trunks.

21. The system of claim 19 wherein:

the performance data of the modem in the first and second communication lines includes the rate at which the modem connects with the first and second trunks.

22. The system of claim 19 wherein:

the performance data of the modem in the first and second communication lines includes the speed of which data is communicated through the modem in the first and second communication lines.

* * * * *